(12) United States Patent
Goto et al.

(10) Patent No.: US 12,448,932 B2
(45) Date of Patent: Oct. 21, 2025

(54) ENGINE CONTROL DEVICE, AND VEHICLE

(71) Applicant: Isuzu Motors Limited, Yokohama (JP)

(72) Inventors: Koji Goto, Kanagawa (JP); Yoshifumi Nagashima, Kanagawa (JP); Shunsuke Kuroki, Kanagawa (JP)

(73) Assignee: Isuzu Motors Limited, Yokohama (JP)

( * ) Notice: Subject to any disclaimer, the term of this patent is extended or adjusted under 35 U.S.C. 154(b) by 0 days.

(21) Appl. No.: 18/710,201

(22) PCT Filed: Nov. 14, 2022

(86) PCT No.: PCT/JP2022/042172
§ 371 (c)(1),
(2) Date: May 15, 2024

(87) PCT Pub. No.: WO2023/090279
PCT Pub. Date: May 25, 2023

(65) Prior Publication Data
US 2024/0352903 A1    Oct. 24, 2024

(30) Foreign Application Priority Data

Nov. 16, 2021    (JP) .................................. 2021-186450

(51) Int. Cl.
*F02D 41/22* (2006.01)
*F02D 19/02* (2006.01)

(52) U.S. Cl.
CPC .......... *F02D 41/22* (2013.01); *F02D 19/023* (2013.01); *F02D 2200/0611* (2013.01)

(58) Field of Classification Search
CPC . F02D 41/22; F02D 19/023; F02D 2200/0611
See application file for complete search history.

(56) References Cited

U.S. PATENT DOCUMENTS

| | | | |
|---|---|---|---|
| 5,909,726 A | | 6/1999 | Kobayashi et al. |
| 6,016,832 A | * | 1/2000 | Vars ...................... F02D 19/023 |
| | | | 123/527 |

(Continued)

FOREIGN PATENT DOCUMENTS

| | | | | |
|---|---|---|---|---|
| DE | 102020115059 A1 | * | 12/2020 | ........... F02D 19/061 |
| JP | 02-056837 | | 4/1990 | |

(Continued)

OTHER PUBLICATIONS

Machine Translation of DE102020115059A1 PDF File Name: "DE102020115059A1_Machine_Translation.pdf".*

*Primary Examiner* — Lindsay M Low
*Assistant Examiner* — Ruben Picon-Feliciano

(57) ABSTRACT

This control device for an engine provided with a fuel supply system capable of supplying liquefied natural gas to the engine as fuel comprises: a control unit for calculating a feedback adjustment value on the basis of a deviation between an actual fuel supply quantity and a target fuel supply quantity, and performing feedback control of the fuel supply system on the basis of the calculated feedback adjustment value; an acquiring unit for acquiring a methane number of the liquefied natural gas; a correcting unit for correcting the feedback adjustment value on the basis of the acquired methane number; and a failure diagnosis unit for performing failure diagnosis of the fuel supply system on the basis of the corrected feedback adjustment value. The engine control device can allow the failure diagnosis of the fuel supply system to operate normally.

2 Claims, 3 Drawing Sheets

(56) References Cited

U.S. PATENT DOCUMENTS

| | | | | |
|---|---|---|---|---|
| 2017/0218837 A1* | 8/2017 | Zhong | .................... | F02B 43/12 |
| 2020/0003137 A1* | 1/2020 | Pedder | ................. | F02D 19/081 |
| 2024/0280061 A1* | 8/2024 | Guglielmo | .......... | F02D 41/0027 |

FOREIGN PATENT DOCUMENTS

| | | |
|---|---|---|
| JP | 10-068360 | 3/1998 |
| JP | 2000-170581 | 6/2000 |
| JP | 2019-035352 | 3/2019 |
| JP | 2021-042733 | 3/2021 |
| JP | 2021-042734 | 3/2021 |
| WO | WO 2014/054081 | 4/2014 |

* cited by examiner

ENGINE CONTROL DEVICE, AND VEHICLE

TECHNICAL FIELD

The present disclosure relates to an engine control device and a vehicle.

BACKGROUND ART

In the related art, LNG (liquefied natural gas) vehicles that use LNG as a fuel are known. A tank for storing LNG is mounted in an LNG vehicle. The LNG fuel stored in the tank is supplied by the supply system to the engine, and burned and consumed by the engine.

PTL 1 discloses an engine including a control part that calculates a feedback correction value on the basis of the deviation between the target fuel supplying amount and the actual fuel supplying amount, and performs feedback control of the fuel supply system on the basis of the calculated feedback correction value.

CITATION LIST

Patent Literature

PTL 1
Japanese Patent Application Laid-Open No. H10-068360

SUMMARY OF INVENTION

Technical Problem

Incidentally, the LNG fuel (hereinafter referred to as fuel) contains components such as methane, ethane, propane and butane. In the case where the fuel in the LNG tank in the vehicle is not maintained at a low temperature, methane with a low boiling point is vaporized first and emitted to the atmosphere because the components of the fuel have different boiling points. In this manner, the fuel supplied to the engine become heavier.

In the engine disclosed in PTL 1, in the case where the defect diagnosis of the fuel supply system is performed on the basis of the difference between the feedback correction value and a reference value, the actual fuel supplying amount varies due to the fuel that has become heavier, and the difference between the feedback correction value and the reference value varies, and as a result, the defect diagnosis of the fuel supply system may not be normally performed.

An object of the present disclosure is to provide an engine control device and a vehicle that can normally perform the defect diagnosis of the fuel supply system.

Solution to Problem

To achieve the above-mentioned object, a control device of an engine including a fuel supply system configured to supply liquefied natural gas as a fuel to an engine according to the present disclosure, includes: a control part configured to calculate a feedback correction value based on a deviation between an actual fuel supplying amount and a target fuel supplying amount, and feedback-control the fuel supply system based on the feedback correction value calculated; an acquiring part configured to acquire a methane value of the liquefied natural gas; a modification part configured to modify the feedback correction value based on the methane value acquired; and a defect diagnosis part configured to perform a defect diagnosis of the fuel supply system based on the feedback correction value modified.

A vehicle of the present disclosure includes the above-described control device of the engine.

Advantageous Effects of Invention

According to the present disclosure, the defect diagnosis of the fuel supply system can be normally performed.

DESCRIPTION OF EMBODIMENTS

Figure 1:
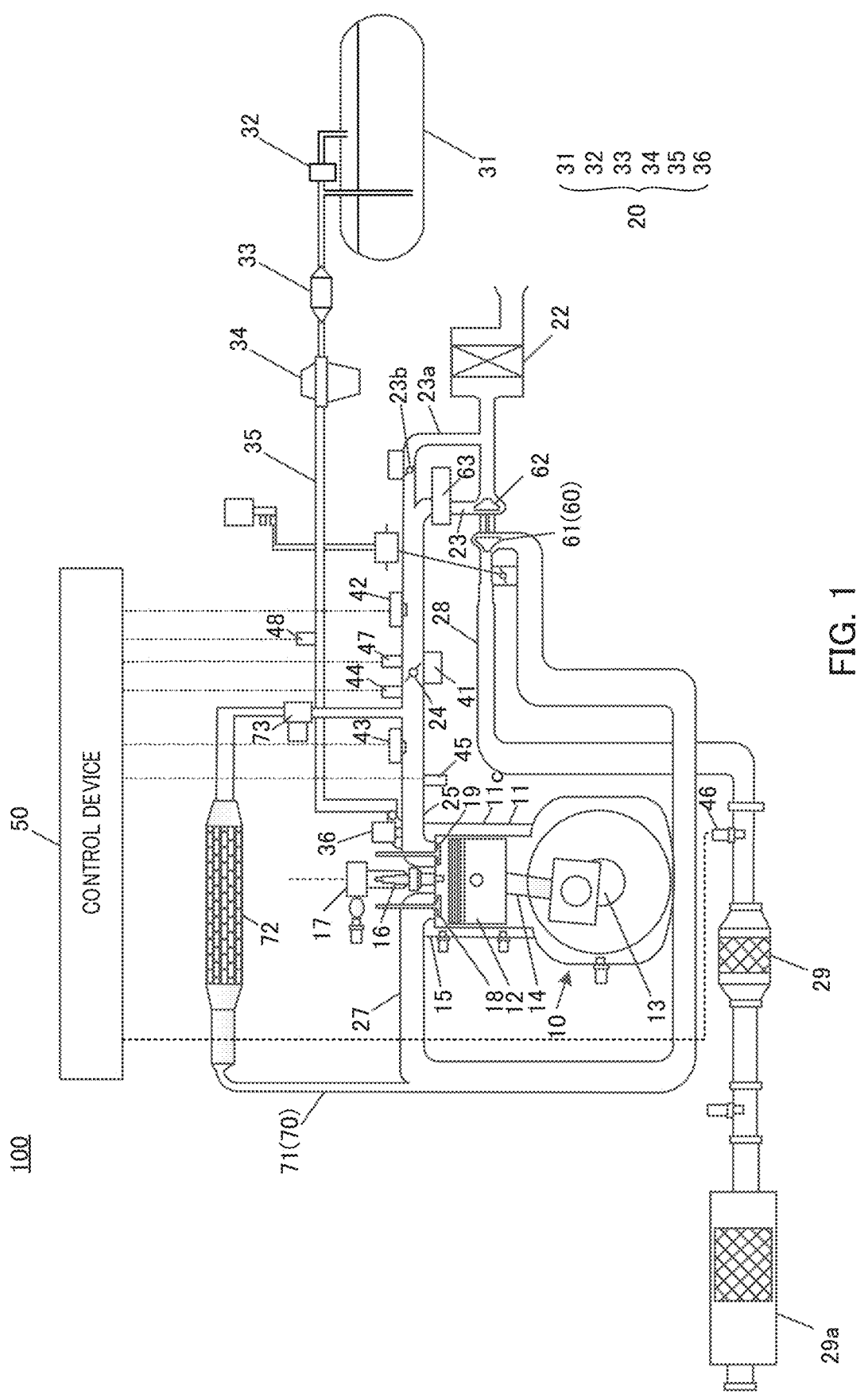
FIG. 1 is a block diagram schematically illustrating a configuration of an internal combustion system according to an embodiment of the present disclosure.

An embodiment of the present disclosure is described below with reference to the drawings. FIG. 1 is a block diagram schematically illustrating a configuration of internal combustion system 100 according to the embodiment of the present disclosure.

As illustrated in FIG. 1, internal combustion system 100 includes LNG engine 10 (hereinafter referred to as engine). Cylinder block 11 of engine 10 is provided with piston 12 for each cylinder 11*c*. Piston 12 is coupled to crankshaft 13 through connecting rod 14. Piston 12 vertically moves in accordance with the rotation of crankshaft 13. Cylinder head 15 above cylinder block 11 is provided with ignition plug 16 for each cylinder 11*c*.

In addition, internal combustion system 100 includes turbocharger 60 (supercharger) that supercharges intake gas, and exhaust recirculation device 70 called EGR (Exhaust Gas Recirculation) that takes out a part of the exhaust gas from the exhaust side and returns it to the intake side. Note that the exhaust gas returned to the intake side is referred to as EGR gas.

Turbocharger 60 includes turbine 61 that is driven by exhaust gas, and compressor 62 that is driven by the driving force of turbine 61 to compress intake gas. Inter cooler 63 that cools intake gas is provided at intake pipe 23 between compressor 62 and intake manifold 25. Intake gas regulation throttle valve 23*b* that regulates the amount of intake gas of bypass passage 23*a* is provided at bypass passage 23*a*.

Exhaust recirculation device 70 includes exhaust recirculation passage 71 that connects the exhaust side and the intake side of engine 10, exhaust recirculation cooler 72 that is provided at exhaust recirculation passage 71 to cool EGR gas, and exhaust recirculation valve 73 that is provided at exhaust recirculation passage 71 to regulate the exhaust recirculation amount.

The intake gas to engine 10 passes from cleaner 22 to intake pipe 23 or bypass passage 23*a*. The intake gas past intake pipe 23 is compressed by compressor 62 and cooled by inter cooler 63. The intake gas past intake pipe 23 or bypass passage 23*a* flows into intake manifold 25 together with the EGR gas from exhaust recirculation passage 71 so as to be mixed with the fuel obtained by vaporizing at LNG vaporizer 33 the liquefied natural gas (LNG) from fuel injector 36 provided for each cylinder 11c and introduced into cylinder 11c, and, ignited and burned by ignition plug 16.

On the intake side of engine 10, throttle opening sensor 41 that detects the opening of intake throttle valve 24, intake gas pressure sensors 42 and 43 that detect the pressure of the intake gas, and intake gas temperature sensors 44 and 45 that detect the temperature of the intake gas are provided. The detection values of sensors 41, 42, 43, 44 and 45 are input to control device 50 (engine control unit). In addition, airflow sensor 47 that detects the amount of the intake gas taken from air cleaner 22 is provided. The detection value of airflow sensor 47 is input to control device 50.

The exhaust gas from cylinder 11c is exhausted to exhaust manifold 27 through exhaust valve 18 such that a part of the gas flows into exhaust recirculation passage 71 and that another part of the gas is supplied to exhaust pipe 28 through turbine 61. The exhaust gas is supplied from exhaust pipe 28 to three-way catalyst 29 such that CO, non-methane hydrocarbon (NMHC), and NOx are removed by three-way catalyst 29 and that it is exhausted to the atmosphere through silencer 29a.

Air-fuel ratio sensor 46 (random sensor) that detects the air-fuel ratio on the basis of the oxygen concentration of the exhaust gas exhausted from exhaust manifold 27 is disposed at exhaust pipe 28. The detection value of air-fuel ratio sensor 46 is input to control device 50.

The LNG is supplied by fuel supply system 20 to engine 10 and used as the fuel of the engine 10. Fuel supply system 20 includes LNG tank 31, LNG pressure regulator 32, LNG vaporizer 33, LNG regulator 34, LNG supply path 35, fuel injector 36 and the like.

LNG tank 31 is mounted in the vehicle, and stores at a low temperature the LNG to maintain it in the liquid state. LNG pressure regulator 32, LNG vaporizer 33, and LNG regulator 34 are disposed at LNG supply path 35. The LNG guided from LNG tank 31 and gas fuel regulated by LNG pressure regulator 32 are mixed, and vaporized by LNG vaporizer 33. The vaporized fuel is depressurized to a given pressure by LNG regulator 34, and supplied by fuel injector 36 to intake manifold 25 of engine 10. The supplied fuel is mixed with the intake gas flown into intake manifold 25 so as to be introduced to each cylinder 11c, and ignited and burned by ignition plug 16. In the following description, the "fuel" means vaporized LNG, not LNG before vaporization.

Methane value sensor 48 that detects the methane value of the fuel supplied from LNG tank 31 to cylinder 11c is disposed at LNG supply path 35. The detection value of methane value sensor 48 is input to control device 50.

Control device 50 includes a CPU (Central Processing Unit), a ROM (Read Only Memory), an EEPROM (Electrically Erasable Programmable Read Only Memory), a RAM (Random Access Memory), an input port, an output port and the like. The CPU of control device 50 executes various functions by loading in the RAM a predetermined program stored in the ROM.

Figure 2:
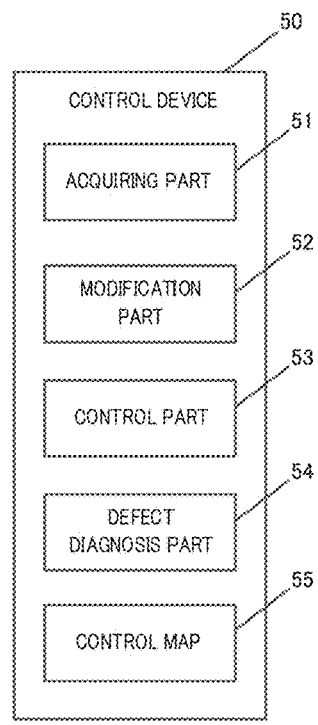
FIG. 2 is a block diagram illustrating a configuration of a control device of an engine.

FIG. 2 is a block diagram illustrating a configuration of control device 50 of engine 10. Control device 50 includes, as the various functions, acquiring part 51, modification part 52, control part 53, and defect diagnosis part 54.

Acquiring part 51 acquires the detection value of air-fuel ratio sensor 46. In addition, acquiring part 51 acquires the detection value (intake gas amount) of airflow sensor 47. In addition, acquiring part 51 acquires the methane value of the fuel from methane value sensor 48.

Control part 53 calculates the actual fuel injection amount jetted from fuel injector 36 on the basis of the detection value of air-fuel ratio sensor 46 and the detection value (intake gas amount) of airflow sensor 47. Control part 53 calculates a feedback correction value for each block on the basis of the deviation between the actual fuel injection amount and the target fuel injection amount. Note that the block is elaborated later. The fuel injection time (ms) per stroke is used for "fuel injection amount". The fuel injection time per stroke is determined on the basis of the fuel amount calculated from the amount of intake gas of engine 10 and the injector coefficient. The amount of intake gas of engine 10 is determined on the basis of the pressure of the intake gas detected by intake gas pressure sensor 43, the temperature of the intake gas detected by intake gas temperature sensor 45, the atmospheric pressure detected by the atmospheric pressure sensor (not illustrated), and the engine rotational frequency detected from a crank angle sensor (not illustrated), for example.

Figure 3:
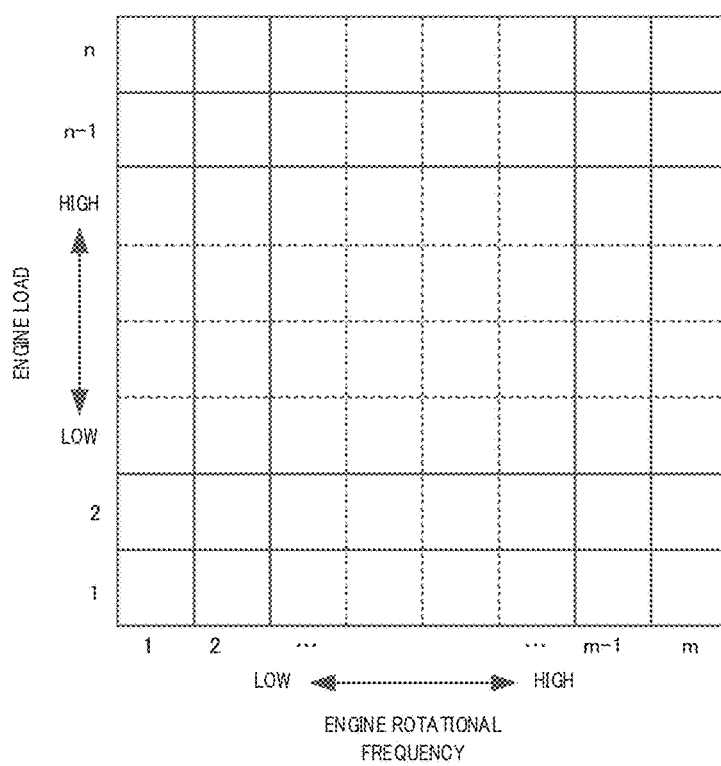
FIG. 3 is a diagram illustrating an example of a control map.

FIG. 3 is a diagram illustrating an example of control map 55. Control map 55 illustrated in FIG. 3 is stored in the EEPROM of control device 50. In control map 55, feedback correction values are associated with a plurality of respective blocks sectioned by the engine rotational frequency and the engine load. Control map 55 is sectioned into m blocks by the engine rotational frequency and into n blocks by the engine load. Specifically, control map 55 is sectioned into (m×n) blocks by the engine rotational frequency and the engine load. Note that m and n are integers of two or more, and may be the same or different from each other. The engine load is determined on the basis of an intake manifold pressure. The intake manifold pressure is detected by intake gas pressure sensors 42 and 43. Note that the engine load this is not limited to this, and may be determined on the basis of a detection value of a torque sensor that detects the degree of the variation of the rotation of the crankshaft, for example.

Control part 53 controls fuel supply system 20 on the basis of the feedback correction value. More specifically, control part 53 controls fuel injector 36.

Incidentally, the feedback correction value and the variation of the actual fuel supplying amount due to the fuel that has become heavier are correlated, and therefore the actual fuel supplying amount varies due to the fuel that has become heavier, and as a result the feedback correction value varies. In addition, since the methane value of the fuel and the variation of the actual fuel supplying amount are correlated, the relational expression representing the relationship between the methane value of the fuel and the feedback correction value can be determined. In addition, the relationship between the methane value of the fuel and the feedback correction value can be determined through experiments and/or simulations, and thus the relationship determined through experiments and/or the like can be stored in the form of table in the EEPROM of control device 50.

Modification part 52 modifies the feedback correction value for each block on the basis of the methane value of the fuel with reference to the relational expression or the table. Thus, the feedback correction value is a numerical value that is not influenced by the fuel that has become heavier. Note that the methane value of the fuel is detected by methane value sensor 48 as described above.

Defect diagnosis part 54 calculates the difference between the reference value and the feedback correction value modified by modification part 52 for each block. Note that the reference value is set with a certain acceptable range on the basis of the results of experiments and/or simulations. When the number of blocks of which the difference exceeds a threshold value is equal to or greater than a predetermined number, defect diagnosis part 54 determines that there is a defect of fuel supply system 20. Here, a defect of fuel supply system 20 is a defect of one or more of the components (such as LNG tank 31, LNG pressure regulator 32, LNG vaporizer 33, LNG regulator 34, LNG supply path 35, and fuel injector 36) of fuel supply system 20, control device 50 that controls fuel supply system 20, and a sensor that outputs the detection value of control device 50.

Figure 4:
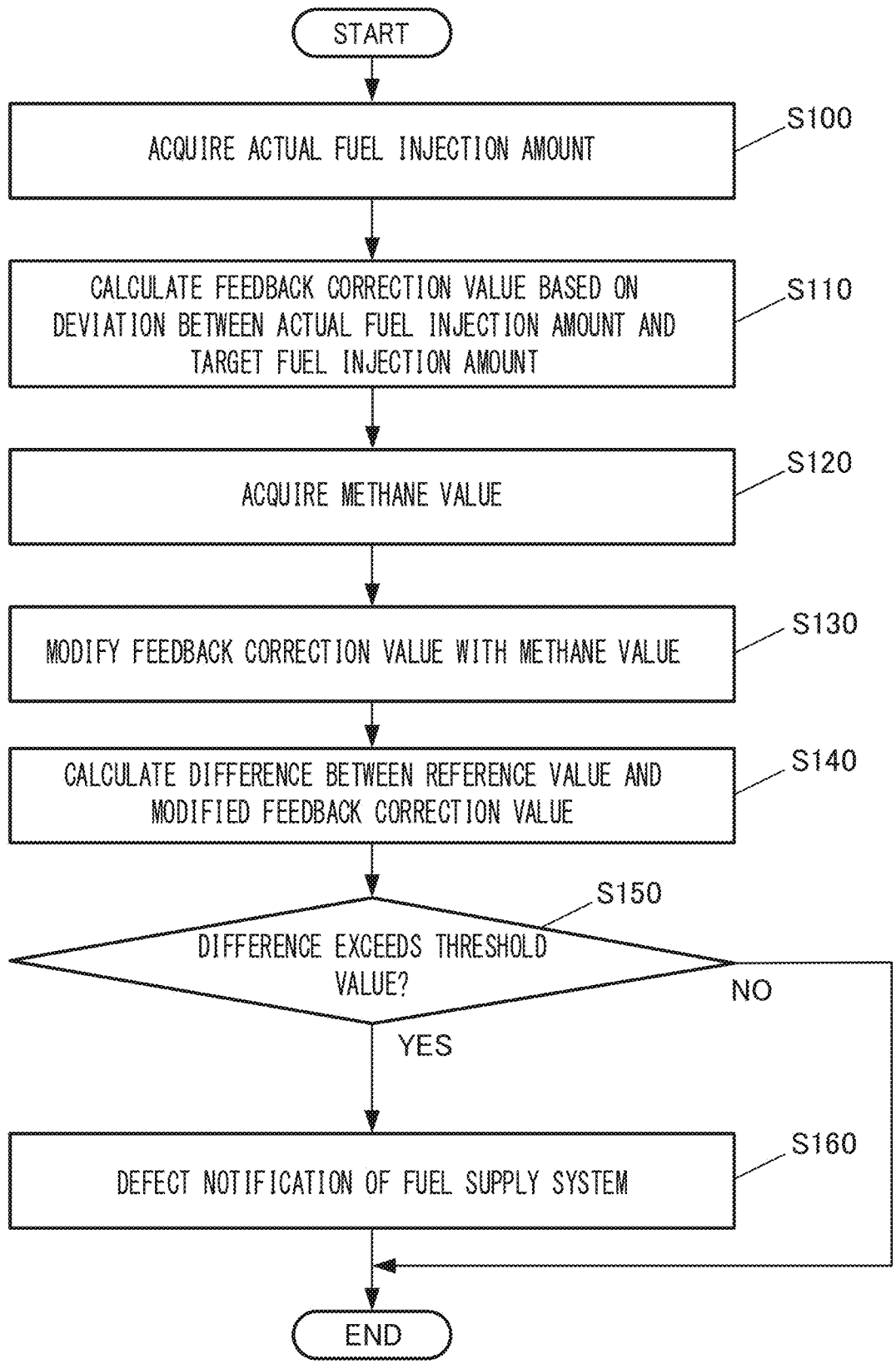
FIG. 4 is a flowchart illustrating an example of a process of the control device of the engine.

Next, an example of a process of control device 50 of engine 10 according to the embodiment of the present disclosure is described with reference to FIG. 4. FIG. 4 is a flowchart illustrating an example of a process of control device 50 of engine 10. This procedure is started in response to the start operation of engine 10 and repeated at a given time interval after the start. Note that the following description will be made on the assumption that various functions of control device 50 are executed by the CPU. In addition, the calculation and modification of the feedback correction value are performed for each block, but the description thereof will be omitted here.

As illustrated in FIG. 4, at step S100, the CPU acquires the actual fuel injection amount.

Next, at step S110, the CPU calculates the feedback correction value on the basis of the deviation between the actual fuel injection amount and the target fuel injection amount.

Next, at step S120, the CPU acquires the methane value from methane value sensor 48.

Next, at step S130, the CPU modifies the feedback correction value with the methane value.

Next, at step S140, the CPU calculates the difference between the reference value and the modified feedback correction value.

Next, at step S150, the CPU determines whether the difference exceeds a threshold value. When the difference exceeds a threshold value (step S150: YES), the process is advanced to step S160. When the difference is equal to or smaller than the threshold value (step S150: NO), the procedure illustrated in FIG. 4 is terminated.

At step S160, the CPU executes a control of a defect notification of fuel supply system 20.

Control device 50 of engine 10 according to the present embodiment is control device 50 of engine 10 including fuel supply system 20 that can supply liquefied natural gas as a fuel to engine 10, and includes control part 53 that calculates a feedback correction value based on a deviation between an actual fuel supplying amount and a target fuel supplying amount, and feedback-controls fuel supply system 20 based on the calculated feedback correction value, acquiring part 51 that acquires a methane value of the liquefied natural gas, modification part 52 that modifies the feedback correction value based on the acquired methane value, and defect diagnosis part 54 that calculates the difference between the reference value and the modified feedback correction value and determines that there is a defect of fuel supply system 20 when the calculated difference exceeds a threshold value.

With the above-mentioned configuration, the difference between the feedback correction value and the reference value is not varied by the fuel that has become heavier because the feedback correction value is modified with the methane value, and thus the defect diagnosis of fuel supply system 20 that is performed on the basis of the difference can be normally performed.

Control device 50 of engine 10 according to the present embodiment further includes control map 55 in which the feedback correction value is associated with each of a plurality of blocks sectioned by the engine rotational frequency and the engine load, and defect diagnosis part 54 calculates the difference between the reference value and the modified feedback correction value for each block, and determines that there is a defect of fuel supply system 20 when the number blocks of which the difference exceeds a threshold value is equal to or greater than a predetermined value. In this manner, the feedback correction value is calculated and modified for each block, and thus the accuracy of the defect diagnosis can be increased.

Note that control part 53 according to the present embodiment calculates a feedback correction value on the basis of the deviation between the actual fuel supplying amount and the target fuel supplying amount and feedback-controls fuel supply system 20 on the basis of the calculated feedback correction value, but the present disclosure is not limited to this. For example, control part 53 may calculate the feedback correction value on the basis of the deviation between the actual air-fuel ratio and the target air-fuel ratio, and feedback-control fuel supply system 20 on the basis of the calculated feedback correction value.

In addition, in the present embodiment, the CPU executes the control of the defect notification of fuel supply system 20 when the difference between the reference value and the modified feedback correction value exceeds a threshold value (step S150: YES). For example, when the difference exceeds a threshold value, the CPU executes a control of displaying on the in-vehicle display device defect information indicating that the difference exceeds a threshold value. In addition, the CPU may execute a control of transmitting the defect information from an in-vehicle information communication terminal to a management terminal via the Internet. In this manner, the defect information can be notified from the management terminal to the driver's personal computer and/or mobile terminal.

In addition, in the present embodiment, the configuration of internal combustion system 100 is applied to engine 10 that supplies the fuel to cylinder 11c together with the intake gas and ignites and burns it by ignition plug 16, but the configuration of internal combustion system 100 may be applied to a direct injection engine that directly jets the fuel into cylinder 11c.

In addition, control device 50 of engine 10 according to the present embodiment may be applied to a dual fuel engine that can use both liquefied natural gas (LNG) and compressed natural gas (CNG) as the fuel in a switching manner.

The above-mentioned embodiments are merely examples of embodiments for implementing the present disclosure, and the technical scope of the present disclosure should not be interpreted as limited by them. In other words, the present disclosure can be implemented in various forms without departing from its gist or its main features.

This application is entitled to and claims the benefit of Japanese Patent Application No. 2021-186450 filed on Nov. 16, 2021, the disclosure each of which including the specification, drawings and abstract is incorporated herein by reference in its entirety.

INDUSTRIAL APPLICABILITY

The present disclosure is suitable for a vehicle equipped with a control device of an engine that needs to normally perform the defect diagnosis of the fuel supply system.

REFERENCE SIGNS LIST

10 Engine
20 Fuel supply system

31 LNG tank
32 LNG pressure regulator
33 LNG vaporizer
34 LNG regulator
35 LNG supply path
36 Fuel injector
40 Temperature pressure sensor
41 Throttle opening sensor
42, 43 Intake gas pressure sensor
44, 45 Intake gas temperature sensor
46 Air-fuel ratio sensor
47 Airflow sensor
48 Methane value sensor
50 Control device (Engine control unit)
51 Acquiring part
52 Modification part
53 Control part
54 Defect diagnosis part
55 Control map
100 Internal combustion system

The invention claimed is:

1. A control device of an engine including a fuel supply system configured to supply liquefied natural gas as a fuel to the engine, comprising a memory to store a feedback correction value associated with each of a plurality of blocks sectioned by an engine rotational frequency and an engine load; and a processor configured to:
calculate a feedback correction value based on a deviation between an actual fuel supplying amount and a target fuel supplying amount, and feedback-control the fuel supply system based on the feedback correction value calculated;
acquire a methane value of the liquefied natural gas;
modify the feedback correction value based on the methane value acquired; and
calculate a difference between a reference value and the feedback correction value modified for each of the plurality of blocks; and determine that there is a defect of the fuel supply system when a number of blocks of which the difference exceeds a threshold value is equal to or greater than a predetermined number;
perform a defect diagnosis of the fuel supply system to determine whether there is a defect of the fuel supply system based on the feedback correction value modified; and
generate a defect notification when it is determined that there is a defect of the fuel supply system.

2. A vehicle comprising the control device of the engine according to claim 1.

* * * * *